(12) United States Patent
Dohan et al.

(10) Patent No.: US 10,997,503 B2
(45) Date of Patent: May 4, 2021

(54) COMPUTATIONALLY EFFICIENT NEURAL NETWORK ARCHITECTURE SEARCH

(71) Applicant: Google LLC, Mountain View, CA (US)

(72) Inventors: David Martin Dohan, San Francisco, CA (US); David Richard So, San Francisco, CA (US); Chen Liang, Stanford, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 16/447,866

(22) Filed: Jun. 20, 2019

(65) Prior Publication Data

US 2020/0401899 A1 Dec. 24, 2020

(51) Int. Cl.
*G06N 3/08* (2006.01)
*G06N 3/04* (2006.01)

(52) U.S. Cl.
CPC .......... *G06N 3/086* (2013.01); *G06N 3/0481* (2013.01)

(58) Field of Classification Search
None
See application file for complete search history.

(56) References Cited

U.S. PATENT DOCUMENTS

| | | | | |
|---|---|---|---|---|
| 2002/0046143 A1* | 4/2002 | Eder | ...................... | G06Q 10/06 705/36 R |
| 2008/0154809 A1* | 6/2008 | Stockwell | .............. | G06N 3/126 706/13 |
| 2011/0029467 A1* | 2/2011 | Spehr | ..................... | G06Q 30/02 706/13 |
| 2011/0087625 A1* | 4/2011 | Tanner, Jr. | ............. | G06N 20/00 706/12 |
| 2014/0243913 A1* | 8/2014 | Lineaweaver | ...... | G06F 19/3481 607/3 |
| 2016/0071520 A1* | 3/2016 | Hayakawa | .............. | G10L 17/04 704/247 |
| 2017/0154260 A1* | 6/2017 | Hamada | ................. | G06N 3/086 |

(Continued)

OTHER PUBLICATIONS

Stanley et al. (Evolving Neural Networks through Augmenting Topologies, Jun. 2001, pp. 1-27) (Year: 2001).*

(Continued)

*Primary Examiner* — George Giroux
(74) *Attorney, Agent, or Firm* — Fish & Richardson P.C.

(57) ABSTRACT

A method for receiving training data for training a neural network to perform a machine learning task and for searching for, using the training data, an optimized neural network architecture for performing the machine learning task is described. Searching for the optimized neural network architecture includes: maintaining population data; maintaining threshold data; and repeatedly performing the following operations: selecting one or more candidate architectures from the population data; generating a new architecture from the one or more selected candidate architectures; for the new architecture: training a neural network having the new architecture until termination criteria for the training are satisfied; and determining a final measure of fitness of the neural network having the new architecture after the training; and adding data defining the new architecture and the final measure of fitness for the neural network having the new architecture to the population data.

26 Claims, 5 Drawing Sheets

(56) References Cited

U.S. PATENT DOCUMENTS

| | | | |
|---|---|---|---|
| 2018/0137219 A1* | 5/2018 | Goldfarb | G06F 30/20 |
| 2018/0322801 A1* | 11/2018 | Dey | G09B 5/08 |
| 2019/0050973 A1* | 2/2019 | Bernal | H04N 7/181 |
| 2019/0073591 A1* | 3/2019 | Andoni | G06F 16/24566 |
| 2019/0080240 A1* | 3/2019 | Andoni | G06N 3/086 |
| 2019/0180187 A1* | 6/2019 | Rawal | G06N 3/0454 |
| 2019/0180188 A1* | 6/2019 | Liang | G06N 3/086 |
| 2019/0207814 A1* | 7/2019 | Jain | H04L 41/0813 |
| 2020/0151573 A1* | 5/2020 | Das | G06N 3/04 |

OTHER PUBLICATIONS

Meissner et al. (Optimized Particle Swarm Optimization (OPSO) and its application to artificial neural network training, Mar. 2006, pp. 1-11) (Year: 2006).*

Ahmed et al, "Weighted Transformer Network for Machine Translation" arXiv, Nov. 2017, 10 pages.

Angeline et al, "An evolutionary algorithm that constructs recurrent neural networks" IEEE Transactions on Neural Networks, Jul. 1993, 28 pages.

Bahdanau et al, "Neural machine translation by jointly learning to align and translate" arXiv, Apr. 2015, 15 pages.

Baker et al, "Accelerating neural architecture search using performance prediction" arXiv, Nov. 2017, 14 pages.

Baker et al, "Designing neural network architectures using reinforcement learning" arXiv, Nov. 2016, 16 pages.

Bergstra et al, "Random search for hyperparameter optimization" Journal of Machine Learning Research, Feb. 2012, 25 pages.

Brock et al, "SMASH: One-shot model architecture search through hypernetworks" arXiv, Aug. 2017, 21 pages.

Cai et al, "Efficient architecture search by network transformation" arXiv, Nov. 2017, 8 pages.

Chelba et al, "One billion word benchmark for measuring progress in statistical language modeling" arXiv, Mar. 2014, 6 pages.

Chen et al, "Dual path networks" arXiv, Aug. 2017, 11 pages.

Chen et al, "The best of both worlds: Combining recent advances in neural machine translation" arXiv, Apr. 2018, 12 pages.

Cireşan et al, "Multi-column deep neural networks for image classification" arXiv, Feb. 2012, 20 pages.

Coleman et al, "Analysis of dawnbench, a time-to-accuracy machine learning performance benchmark" arXiv, Jun. 2018, 11 pages.

Cortes et al, "Adanet: Adaptive structural learning of artificial neural networks" arXiv, Feb. 2017, 14 pages.

Cubuk et al, "Autoaugment: Learning augmentation policies from data" arXiv, Apr. 2019, 14 pages.

Dai et al, "Semi-supervised sequence learning" arXiv, Nov. 2015, 10 pages.

Dauphin et al, "Language modeling with gated convolutional networks" arXiv, Sep. 2017, 9 pages.

Deng et al, "Imagenet: A large-scale hierarchical image database" IEEE Conference on Computer Vision and Pattern Recognition, 2009, 8 pages.

Devlin et al, "BERT: pre-training of deep bidirectional transformers for language understanding"arXiv, May 2019, 16 pages.

Domhan et al, "Speeding up automatic hyperparameter optimization of deep neural networks by extrapolation of learning curves" IJCAI, 2017, 9 pages.

Elfwing et al, "Sigmoid-weighted linear units for neural network function approximation in reinforcement learning" Neural Networks, Jan. 2018, 9 pages.

Elsken et al, "Neural architecture search: A survey" arXiv, Apr. 2019, 21 pages.

Elsken et al, "Simple and efficient architecture search for convolutional neural networks" arXiv, Nov. 2017, 14 pages.

Fahlman et al, "The cascade-correlation learning architecture" NIPS, 1990, 9 pages.

Feurer et al, "Efficient and robust automated machine learning" NIPS, 2015, 9 pages.

Floreano et al, "Neuroevolution: from architectures to learning" Evolutionary Intelligence, 2008, 16 pages.

Gehring et al, "Convolutional sequence to sequence learning" arXiv, Jul. 2017, 15 pages.

Goldberg et al, "A comparative analysis of selection schemes used in genetic algorithms" Foundations of Genetic Algorithms, 1991, 27 pages.

He et al, "Deep residual learning for image recognition" arXiv, Dec. 2015, 12 pages.

Henderson et al, "Deep reinforcement learning that matters" arXiv, Jan. 2019, 26 pages.

Hochreiter et al, "Long short-term memory" Neural Computation, 1997, 32 pages.

Hornby et al, "Alps: the age-layered population structure for reducing the problem of premature convergence" GECCO, Jul. 2006, 8 page.

Hu et al, "Squeeze-and-excitation networks" arXiv, May 2019, 13 pages.

Huang et al, "Densely connected convolutional networks" arXiv, Jan. 2018, 9 pages.

Huang et al, "Gpipe: Efficient training of giant neural networks using pipeline parallelism" arXiv, Jul. 2019, 11 pages.

Jamieson et al, "Hyperband: a novel bandit-based approach to hyperparameter optimization" arXiv, Jun. 2018, 52 pages.

Jamieson et al, "Non-stochastic best arm identification and hyperparameter optimization"Proceedings of the 19th International Conference on Artificial Intelligence on Statistics (AISTATS), 2016, 9 pages.

Klein et al, "Learning curve prediction with bayesian neural networks" ICLR, 2017, 16 pages.

Krizhevsky et al, "Imagenet classification with deep convolutional neural networks" NIPS, 2012, 9 pages.

Krizhevsky et al, "Learning multiple layers of features from tiny images" Apr. 2009, 60 pages.

Lei Ba et al, "Layer Normalization" arXiv, Jul. 2016, 14 pages.

Liu et al, "Hierarchical representations for efficient architecture search" arXiv, Feb. 2018, 13 pages.

Liu et al, "Progressive neural architecture search" arXiv, Jul. 2018, 20 pages.

Loshchilov et al, "Sgdr: Stochastic gradient descent with warm restarts" arXiv, May 2017, 16 pages.

Maas et al, "Rectifier non-linearities improve neural network acoustic models" International Conference on Machine Learning, 2013, 6 pages.

Mendoza et al, "Towards automatically-tuned neural networks" JMLR: Workshop and Conference Proceedings, 2016, 8 pages.

Merrienboer et al, "On the properties of neural machine translation" Encoderdecoder approaches arXiv, Oct. 2014, 9 pages.

Miikkulainen et al, "Evolving deep neural networks" arXiv, Mar. 2017, 8 pages.

Miller et al,"Designing neural networks using genetic algorithms" ICGA, 1989, 6 pages.

Negrinho et al, "Deeparchitect: Automatically designing and training deep architectures" arXiv, Apr. 2017, 12 pages.

Ott et al, "Scaling neural machine translation" arXiv, Sep. 2018, 9 pages.

Paracrawl.com [online] "Borader Web-Scale Provision of Parallel Corpora for European Languages," Sep. 2017 [retrieved on Aug. 12, 2019] retreieved from: URL <https://paracrawl.eu/download.html>, 5 page.

Peters et al, "Deep contextualized word representations" arXiv, Mar. 2018, 15 pages.

Pham et al, "Efficient neural architecture search via parameter sharing" arXiv, Feb. 2018, 11 pages.

Pham et al, "Faster discovery of neural architectures by searching for paths in a large model" ICLR workshop, 2018, 15 pages.

Post, "A call for clarity in reporting BLEU scores" arXiv, Sep. 2018, 6 pages.

Radford et al, "Improving language understanding by generative pre training" Open AI, 2018, 12 pages.

Ramachandran et al, "Searching for activation functions" arXiv, Oct. 2017, 13 pages.

(56) References Cited

OTHER PUBLICATIONS

Real et al, "Large-scale evolution of image classifiers" arXiv, Jun. 2017, 18 pages.
Real et al, "Regularized Evolution for Image Classifier Architecture Search," arXiv, Feb. 16, 16 pages.
Salimans et al, "Evolution strategies as a scalable alternative to reinforcement learning" arXiv, Sep. 2017, 13 pages.
Saxena et al, "Convolutional neural fabrics" NIPS, 2016, 9 pages.
Shaw et al, "Self-attention with relative position representations" arXiv, Apr. 2018, 5 pages.
Shazeer et al, "Adafactor: adaptive learning rates with sublinear memory cost" arXiv, Apr. 2018, 9 pages.
Simmons et al, "False-positive psychology: Undisclosed flexibility in data collection and analysis allows presenting anything as significant" Psychology Science, Oct. 2011, 9 pages.
So et al, "The evolved transformer," arXiv, May 17, 2019, 14 pages.
Srivastava et al, "Dropout: A simple way to prevent neural networks from overfitting" Journal of Machine Learning, Jun. 2014, 30 pages.
Stanley et al, "Evolving neural networks through augmenting topologies" Massachusetts Institute of Technology, 2002, 29 pages.
Stanley et al, "Real-time neuroevolution in the nero video game" IEEE Transactions on Evolutionary Computation, Dec. 2005, 41 pages.
Suganuma et al, "A genetic programming approach to designing convolutional neural network architectures" arXiv, Aug. 2017, 9 pages.
Sutskever et al, "Sequence to sequence learning with neural networks" Advances in Neural Information Processing Systems, 2014, 9 pages.
Szegedy et al, "Going deeper with convolutions" arXiv, Sep. 2014, 12 pages.
Szegedy et al, "Inception-v4, inception-resnet and the impact of residual connections on learning" arXiv, Aug. 2016, 12 pages.
Van Den Oord et al, "Wavenet: A generative model for raw audio" arXiv, Sep. 2016, 15 pages.
Vaswani et al, "Attention Is All You Need", arXiv, Dec. 6, 2017, 15 pages.
Vaswani et al, "Tensor2tensor for neural machine translation" arXiv, Mar. 2018, 9 pages.
Wan et al, "Regularization of neural networks using dropconnect" Proceedings of the 30th International Conference on Machine Learning, 2013, 12 pages.
Wu et al, "Google's neural machine translation system: Bridging the gap between human and machine translation" arXiv, Oct. 2016, 23 pages.
Wu et al, "Pay less attention with lightweight and dynamic convolutions" arXiv, Feb. 2019, 14 pages.
Xie et al, "Aggregated residual transformations for deep neural networks" arXiv, Apr. 2017, 10 pages.
Xie et al, "Genetic cnn" IEEE International Conference on Computer Vision (ICCV), 2017, 10 pages.
Xie et al, "SNAS: stochastic neural architecture search" ICLR, 2019, 17 pages.
Yao, "Evolving artificial neural networks" IEEE, 1999, 25 pages.
Yu et al, "Fast and accurate reading comprehension by combining self-attention and convolution" ICLR, 2018, 15 pages.
Zagoruyko et al, "Wide residual networks" arXiv, 2016, 15 pages.
Zela et al, "Towards automated deep learning: efficient joint neural architecture and hyperparameter search" arXiv, Jul. 2018, 11 pages.
Zhang et al, "Polynet: A pursuit of structural diversity in very deep networks" arXiv, Jul. 2017, 9 pages.
Zhong et al, "Practical network blocks design with q-learning" arXiv, Aug. 2017, 11 pages.
Zoph et al, "Learning transferable architectures for scalable image recognition" arXiv, Apr. 2018, 14 pages.
Zoph et al, "Neural architecture search with reinforcement learning" arXiv, Feb. 2017, 16 pages.

* cited by examiner

COMPUTATIONALLY EFFICIENT NEURAL NETWORK ARCHITECTURE SEARCH

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for determining an optimized neural network architecture for a neural network configured to perform a machine learning task. The method comprises receiving training data for training a neural network to perform a machine learning task, the training data comprising a plurality of training examples and a respective target output for each of the training examples; and searching for an optimized neural network architecture for performing the machine learning task, comprising: maintaining population data comprising, for each candidate architecture in a population of candidate architectures, (i) data defining the candidate architecture, and (ii) a measure of fitness representing the performance of the candidate architecture; maintaining threshold data comprising a set of threshold fitness values, wherein each threshold fitness value is associated with a corresponding checkpoint during the training of the neural network; and repeatedly performing the following operations: selecting one or more candidate architectures from the population data; generating a new architecture from the one or more selected candidate architectures; for the new architecture: training a neural network having the new architecture until termination criteria for the training are satisfied, wherein the termination criteria specify that at each checkpoint, training is terminated at the checkpoint whenever a measure of fitness of the neural network having the new architecture as of the checkpoint does not satisfy the threshold fitness value corresponding to the checkpoint; and determining a final measure of fitness of the neural network having the new architecture after the training; and adding data defining the new architecture and the final measure of fitness for the neural network having the new architecture to the population data.

The operations may further comprise determining whether to add a new threshold fitness value to the set of threshold fitness values; and in response to determining to add a new threshold fitness value: determining a mean of the measures of fitness of at least some of the candidate architectures in the population data; adding the mean of the measures of fitness as a new threshold fitness value to the set of threshold fitness values; and associating the new threshold fitness value with a corresponding checkpoint. The operations may further comprise removing one or more candidate architectures from the population data based on their respective measures of fitness. The operations may further comprise initializing the population with a plurality of default candidate architectures. Data defining the candidate architecture may comprise data specifying an architecture for one or more components that are each repeated multiple times to generate the candidate architecture. Generating a new architecture from the one or more selected candidate architectures may comprise modifying the architecture for at least one of the components in one of the selected candidate architectures. Modifying the architecture for at least one of the components in one of the selected candidate architectures may comprise randomly selecting a mutation from a set of mutations; and applying the randomly selected mutation to the architecture for the component. Modifying the architecture for at least one of the components in one of the selected candidate architectures may further comprise selecting a component in a first one of the selected candidate architectures; and modifying a corresponding component in a second one of the selected candidate architectures to have the same architecture as the selected component in the first one of the selected candidate architectures. Selecting one or more candidate architectures from the population data may comprise randomly selecting a plurality of candidate architectures from the population data; and selecting, from the plurality of randomly selected candidate architectures, one or more candidate architectures based on their respective measures of fitness. Searching for, using the training data, an optimized neural network architecture for performing the machine learning task may further comprise after repeatedly performing the following operations, selecting the candidate architecture in the population having the best measure of fitness as the optimized architecture. The machine learning task may be one or more of the following: image classification, object detection, machine translation or speech recognition.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. By determining the architecture of a neural network using the searching technique as described in this specification, a system can enable a population of candidate architectures to improve over time, resulting in an optimized neural network having better performance (e.g., better accuracy) when performing the particular machine learning task compared to existing neural network architecture search methods. Further, using the described technique, the system can automatically generate a resultant trained neural network that is able to achieve performance on a machine learning task competitive with or exceeding state-of-the-art hand-designed models while requiring little or no input from a neural network designer. Additionally, during the searching process, the termination criteria guarantees that neural networks with well-performing candidate architectures, i.e., candidate architectures having measures of fitness that constantly satisfy every one of the set of threshold fitness values, pass all corresponding checkpoints and thus receive more training iterations. On the other hand, neural networks with poor-performing candidate architectures, i.e., candidate architectures having measures of fitness that fail to satisfy at least some of the threshold fitness values, fail to pass the corresponding checkpoints and the training is terminated immediately. By doing so, during the search process, the system dynamically allocates more computing resources, which are usually expensive for machine learning tasks like natural language processing, to more promising candidate architectures. Thus, the techniques for determining the optimized neural network architecture can be carried out in a more efficient manner.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network architecture optimization system implemented as computer programs on one or more computers in one or more locations that determines an optimized network architecture for a neural network configured to perform a particular machine learning task. Depending on the task, the neural network generates an output sequence that includes a respective output at each of multiple positions in an output order from an input sequence that includes a respective input at each of multiple positions in an input order, i.e., transduces the input sequence into the output sequence.

For example, the task may be a machine translation task. That is, if the input sequence is a sequence of words in an original language, e.g., a sentence or phrase, the output sequence may be a translation of the input sequence into a target language, i.e., a sequence of words in the target language that represents the sequence of words in the original language.

As another example, the task may be a speech recognition task. That is, if the input sequence is a sequence of audio data representing a spoken utterance, the output sequence may be a sequence of graphemes, characters, or words that represents the utterance, i.e., is a transcription of the input sequence.

As another example, the task may be a natural language processing task. For example, if the input sequence is a sequence of words in an original language, e.g., a sentence or phrase, the output sequence may be a summary of the input sequence in the original language, i.e., a sequence that has fewer words than the input sequence but that retains the essential meaning of the input sequence. As another example, if the input sequence is a sequence of words that form a question, the output sequence can be a sequence of words that form an answer to the question.

As another example, the task may be part of a computer-assisted medical diagnosis task. For example, the input sequence can be a sequence of data from an electronic medical record and the output sequence can be a sequence of predicted treatments.

As another example, the task may be part of an image processing task. For example, the input sequence can be an image, i.e., a sequence of color values from the image, and the output can be a sequence of text that describes the image. As another example, the input sequence can be a sequence of text or a different context and the output sequence can be an image that describes the context.

Figure 1:
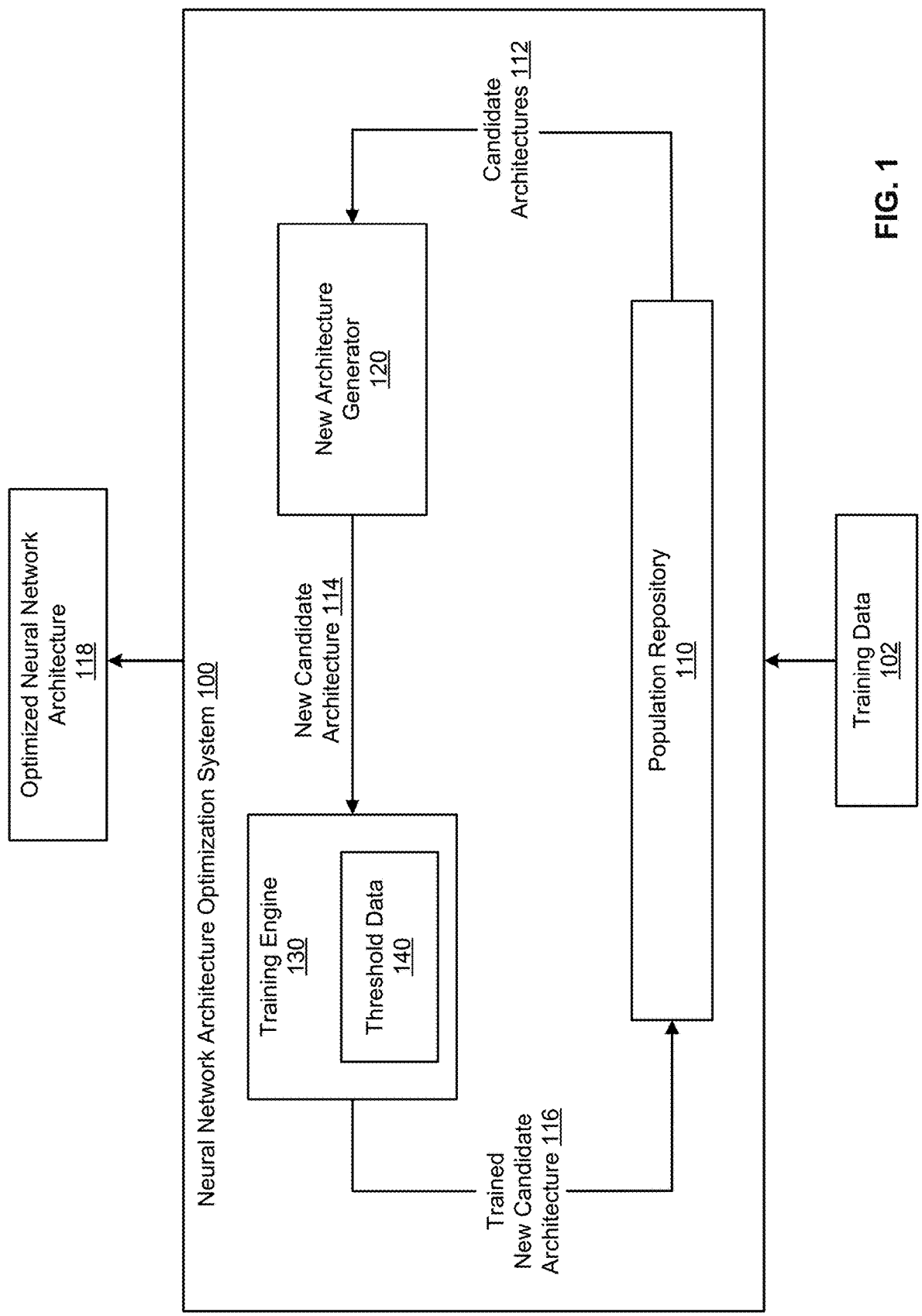
FIG. 1 shows an example neural network architecture optimization system.

FIG. 1 shows an example neural network architecture optimization system 100. The neural network architecture optimization system 100 is an example of a system implemented as computer programs on one or more computers in one or more locations, in which the systems, components, and techniques described below can be implemented.

The neural network architecture optimization system 100 is a system that receives, i.e., from a user of the system, training data 102 for training a neural network to perform a machine learning task and uses the training data 102 to determine an optimized neural network architecture 118 for performing the machine learning task.

The machine learning task is a task that is specified by the user that submits the training data 102 to the system 100.

In some implementations, the user explicitly defines the task by submitting data identifying the task to the neural network architecture optimization system 100 with the training data 102. For example, the system 100 may present a user interface on a user device of the user that allows the user to select the task from a list of tasks supported by the system 100. That is, the neural network architecture optimization system 100 can maintain a list of machine learning tasks, e.g., image processing tasks like image classification and object detection, natural language processing tasks like machine translation and speech recognition, and so on. The system 100 can allow the user to select one of the maintained tasks as the task for which the training data is to be used by selecting one of the tasks in the user interface.

In some other implementations, the training data 102 submitted by the user specifies the machine learning task. That is, the neural network architecture optimization system 100 defines the task as a task to process inputs having the same format and structure as the training examples in the training data 102 in order to generate outputs having the same format and structure as the target outputs for the training examples.

For example, if the training examples are images having a certain resolution and the target outputs are one-hundred dimensional vectors, the system 100 can identify the task as a task to map an image having the certain resolution to a one-hundred dimensional vector. For example, the one-hundred dimensional target output vectors may have a single element with a non-zero value. The position of the non-zero value indicates which of 100 classes the training example image belongs to. In this example, the system 100 may identify that the task is to map an image to a one-hundred dimensional probability vector. Each element represents the probability that the image belongs to the respective class. The CIFAR-100 dataset, which consists of 50000 training examples paired with a target output classification selected from 100 possible classes, is an example of such training data 102. CIFAR-10 is a related dataset where the classification is one of ten possible classes. Another example of suitable training data 102 is the MNIST dataset where the training examples are images of handwritten digits and the target output is the digit which these represent. The target output may be represented as a ten dimensional vector having a single non-zero value, with the position of the non-zero value indicating the respective digit.

As another example, if the training examples are texts of some content in a source natural language and the target outputs are texts of the same content but in a different target natural language, the system 100 can identify the task as a task to translate the texts in a source language to a different target language. In some implementations, both training examples and target outputs may include sentences of any sequence, including randomly shuffled sentences, and of any length, including empty sentences. The WMT 2014 English-to-German dataset, which includes approximately 4.5 million pairs of sentences in English as source language and German as target language, is an example of such training data 102.

The training data 102 generally includes multiple training examples and a respective target output for each training example. The target output for a given training example is the output that should be generated by the trained neural network by processing the given training example. The system 100 divides the received training data into a training subset, a validation subset, and, optionally, a test subset.

The system 100 can receive the training data 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used as the training data 102.

Generally, the optimization system 100 determines the optimized architecture 118 by performing multiple iterations of a search process to repeatedly update the candidate architectures in a population of candidate architectures.

The neural network architecture optimization system 100 includes a population repository 110, a new architecture generator 120, and a training engine 130.

The population repository 110 is implemented as one or more logical storage devices or one or more physical storage devices in one or more physical locations and stores data specifying the current population of candidate neural network architectures at any given time during the search process. To begin the search process, the system 100 can initialize the population repository with one or more default candidate neural network architectures.

In particular, the population repository 110 stores population data including, for each candidate architecture in the population of candidate architectures, (i) data defining the candidate architecture, and (ii) a measure of fitness representing the performance of the neural network having the candidate architecture on the machine learning task.

By performing the search process, the new architecture generator 120 and the training engine 130 repeatedly update the population of possible candidate neural network architectures in the population repository 110 to improve the measure of fitness of the population.

The candidate architectures in the population can be in any appropriate form that receives the inputs for a machine learning task and generates respective outputs required for the machine learning task. Each candidate architecture can include any of neural network components, for example, any of neural network layers (e.g., normalization, convolution, activation, etc.), and any of neural network structures (e.g., branching, direct connection, skip connection, etc.). In some implementations, the components are each repeated multiple times to generate the candidate architecture.

At each iteration of the search process, the system 100 selects one or more candidate architectures from the population repository 110. In some implementations, the system 100 randomly selects the one or more candidate architectures 112 from the repository 110. In some other implementations, the system 100 randomly selects a plurality of candidate architectures from the population repository 110 and then, from the plurality of randomly selected candidate architectures, the system 100 selects one or more candidate architectures 112 with the best measures of fitness.

The new architecture generator 120 then generates a new candidate architecture 114 based on the one or more selected candidate architectures 112 from the population repository 110.

In some implementations, the system 100 selects only a single candidate architecture and the new architecture generator 120 modifies the selected candidate architecture to generate the new candidate architecture 114. For example, the new architecture generator 120 can maintain a set of possible mutations that can be applied to an input architecture. The generator 120 can randomly select a mutation from a set of mutations, and apply the randomly selected mutation to the selected candidate architecture. The set of possible mutations can include any of a variety of architecture modifications that represent the addition, removal, or modification of a component (e.g., a layer or a structure) from an architecture or a change in a hyper-parameter for the training of the neural network having the architecture.

In some other implementations, the system 100 selects multiple candidate architectures and the new architecture generator 120 generates a new candidate architecture 114 by applying a crossover to one of the selected architectures. For instance, the architecture generator 120 can select a component in a first one of the selected candidate architectures, and modify a corresponding component in a second one of the selected candidate architectures to have the same architecture as the selected component in the first one of the selected candidate architectures.

The training engine 130 maintains threshold data 140, including a set of threshold fitness values that are each associated with a corresponding checkpoint during the training of the neural network. As will be described in more detail below with reference to FIG. 4, the training engine 130 periodically adds new threshold fitness values to the threshold data 140 as the search process progresses.

After the system 100 has generated the new candidate architecture, the training engine 130 trains a neural network having the new candidate architecture on a training subset of the training data 102 until termination criteria for the training are satisfied. For example, one termination criterion can specify that at each checkpoint, training is terminated at the checkpoint whenever a measure of fitness of the new architecture as of the checkpoint does not satisfy the threshold fitness value corresponding to the checkpoint.

In this example, neural networks with well-performing candidate architectures, i.e., candidate architectures having measures of fitness that constantly satisfy every one of the set of threshold fitness values, pass all corresponding checkpoints and thus receive more training iterations. On the other hand, neural networks with poor-performing candidate architectures, i.e., candidate architectures having measures of fitness that fail to satisfy at least some of the threshold fitness values, fail to pass the corresponding checkpoints and the training is terminated immediately. By doing so, during the search process, the system dynamically allocates more computing resources, which are usually expensive for machine learning tasks like natural language processing, to more promising candidate architectures.

Once termination criteria for training a neural network have been satisfied, the training engine 130 then determines a final measure of fitness of the new architecture and adds the trained new candidate architecture 116 and the corresponding final measure of fitness to the population repository 110.

Optionally, the system 100 also removes one or more candidate architectures from the population repository 110 at each iteration or at some predetermined subset of the iterations of the search process. For example, the system 100 can remove the candidate architecture that has the worst measure of fitness. By removing the architecture with the worst measure of fitness at each iteration, the system is able to maintain a predetermined size of the population and to maintain a population that has a more satisfying overall measure of fitness, which can result in better architecture search results.

Once termination criteria for the search process have been satisfied (e.g., after more than a threshold number of iterations of the search process have been performed or after the best fit candidate architecture in the population repository 110 has a fitness that satisfies a threshold), the neural network architecture optimization system 100 selects an optimized neural network architecture 118 from the architectures remaining in the population or, in some cases, from all of the architectures that were in the population at any point during the training.

In particular, in some implementations, the neural network architecture optimization system 100 selects the architecture in the population that has the best measure of fitness. In other implementations, the neural network architecture optimization system 100 tracks measures of fitness for architectures even after those architectures are removed from the population and selects the architecture that has the best measure of fitness using the tracked measures of fitness.

In some implementations, after the completion of the search process, the system 100 trains a neural network having the optimized architecture, e.g., either from scratch or to fine-tune the parameter values generated as a result of determining the optimized architecture for the neural network. The system 100 can further train the neural network having the optimized neural network architecture on more training data to determine the final trained values of the parameters of the trained neural network.

The system 100 then uses the trained neural network to process requests received by users, e.g., through the API provided by the system. In some implementations, the system can provide the data specifying the optimized architecture and, optionally, the trained parameter values, in response to receiving the training data 102, e.g., to a user over a data communication network.

In implementations where the system 100 generates a test subset from the training data, the system also tests the performance of a trained neural network having the optimized neural network architecture on the test subset to determine a measure of fitness of the trained neural network on the user-specified machine learning task. The system 100 can then provide the measure of fitness for presentation to the user that submitted the training data, i.e., as an indication that a well-performing architecture has been found, or store the measure of fitness in association with the trained values of the parameters of the trained neural network.

Figure 2:
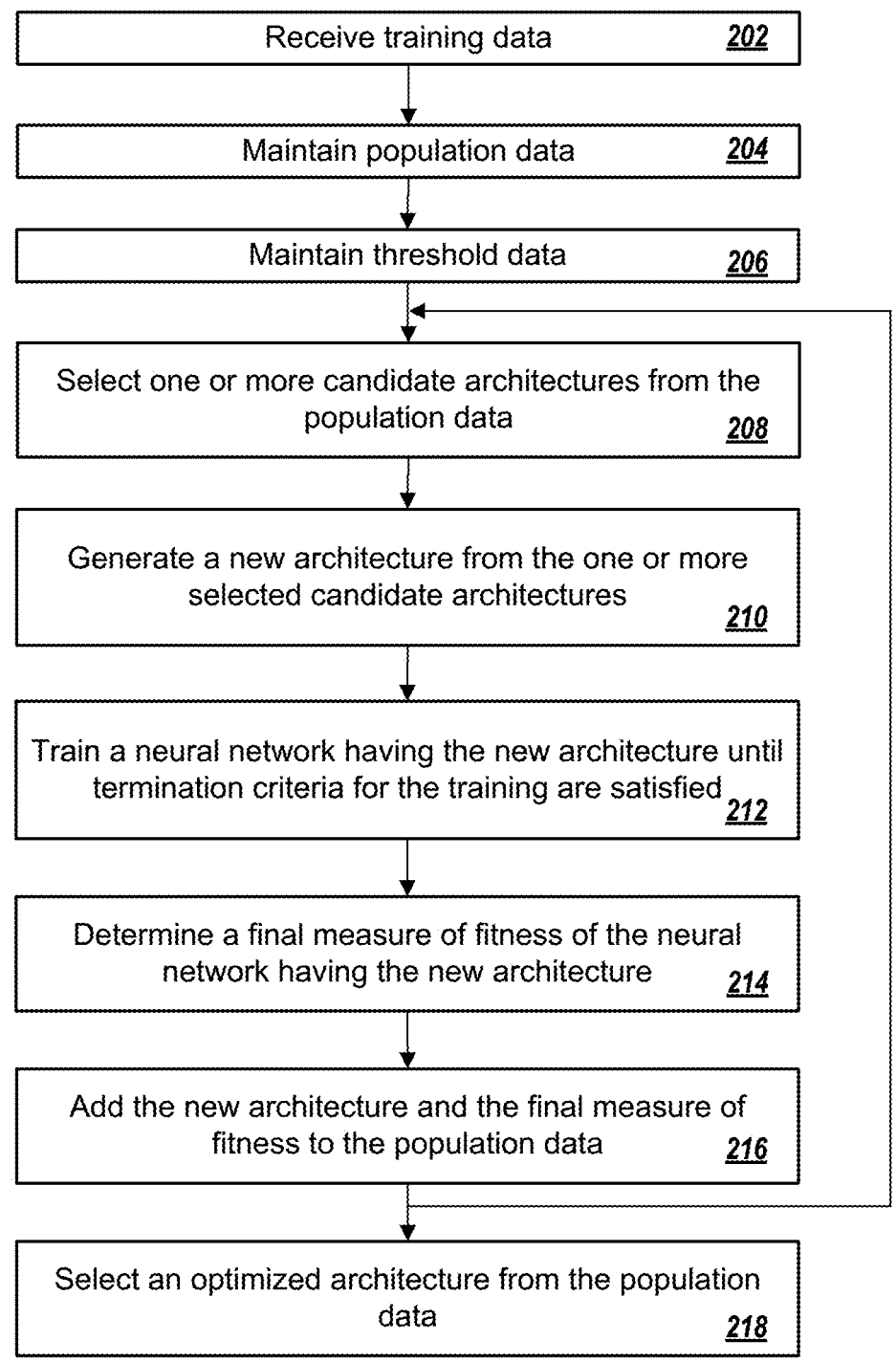
FIG. 2 is a flow diagram of an example process for determining an optimized neural network architecture for performing a machine learning task.

FIG. 2 is a flow diagram of an example process 200 for determining an optimized neural network architecture for performing a machine learning task. For convenience, the process 200 will be described as being performed by a system of one or more computers located in one or more locations. For example, a neural network architecture optimization system, e.g., the neural network architecture optimization system 100 of FIG. 1, appropriately programmed in accordance with this specification, can perform the process 200.

The system receives training data for training a neural network to perform a machine learning task (step 202). The training data includes a plurality of training examples and a respective target output for each of the training examples. The system divides the received training data into a training subset, a validation subset, and, optionally, a test subset.

The system maintains population data in a population repository (step 204). The system can initialize the population repository with one or more default neural network architectures. The population data includes, for each candidate architecture in a population of candidate architectures, (i) data defining the candidate architecture, and (ii) a measure of fitness representing the performance of the neural network having the candidate architecture on the machine learning task.

The system also maintains threshold data (step 206). The threshold data includes a set of threshold fitness values that are each associated with a corresponding checkpoint during the training of the neural network.

The system repeatedly performs the following steps 208-216 until termination criteria for the search process have been satisfied.

The system selects one or more candidate architectures from the population data (step 208).

The system generates a new candidate architecture based on the one or more selected candidate architectures (step 210). In some implementations, the system selects only a single candidate architecture and modifies the selected candidate architecture to generate the new candidate architecture. For example, the system can maintain a set of possible mutations that can be applied to an input architecture. The system can randomly select a mutation from a set of mutations, and apply the randomly selected mutation to the selected candidate architecture.

The set of possible mutations can include any of a variety of architecture modifications that represent the addition, removal, or modification of a component from an architecture or a change in a hyper-parameter for the training of the neural network having the architecture.

In some other implementations, the system selects multiple candidate architectures and then generates the new candidate architecture by applying a crossover to one of the selected architectures. For instance, the system can select a component in a first one of the selected candidate architectures, and modify a corresponding component in a second one of the selected candidate architectures to have the same architecture as the selected component in the first one of the selected candidate architectures.

The system trains a neural network having the new candidate architecture on a training subset of the training data until termination criteria for the training are satisfied (step 212). Termination criteria for the training and how to determine when termination criteria are satisfied during training are described in detail below with reference to FIG. 3.

Once termination criteria for training a neural network have been satisfied, the system determines a final measure of fitness by evaluating a performance of the trained new neural network on a validation subset of the training data (step 214).

The measure of fitness can be determined by any metric that is appropriate for the machine learning task and that measures the performance of the neural network on the machine learning task, i.e., that measures how well the trained new neural network performs the machine learning task. For example, if the task is an image processing task, metrics can include various classification errors, intersection-over-union measures, reward or return metrics, and so on. As another example, if the task is a natural language processing task, metrics can include bilingual evaluation understudy (BLEU) scores, recall-oriented understudy for gisting evaluation (ROUGE) scores, perplexity, and so on.

Generally, depending on specific machine learning tasks, the measure of fitness can be considered to satisfy the threshold when it exceeds the threshold (e.g., for metrics where higher scores reflect higher quality, e.g., BLEU scores). In other cases, the measure of fitness can be considered to satisfy the threshold when it is below the threshold (e.g., for metrics where lower scores reflect higher quality, e.g., perplexity). Alternatively, in some cases where a lower metric indicates better performance (e.g., perplexity), the measure of fitness is negatively proportional to the metric, i.e., through a negative logarithmic transform. Therefore, a high measure of fitness generally represents satisfying performance of a neural network on the machine learning task and the system still considers measures of fitness that exceed the threshold to satisfy the threshold.

The system adds the new candidate architecture and the corresponding final measure of fitness to the population data (step 216).

Optionally, in order to maintain a predetermined size of population, at each iteration or at some predetermined subset of the iterations of the search process, the system removes one or more candidate architectures from the population based their respective measures of fitness. For example, upon adding a new candidate architecture to the population, the system removes an existing candidate architecture from the population having the worst measure of fitness.

Once termination criteria for the search process have been satisfied (e.g., after more than a threshold number of iterations of the search process have been performed or after the best fit candidate neural network in the population repository has a fitness that satisfies a threshold), the system selects an optimized neural network architecture from the architectures remaining in the population or, in some cases, from all of the architectures that were in the population at any point during the training (step 218).

In particular, in some implementations, the system selects the architecture in the population that has the best measure of fitness. In other implementations, the system tracks measures of fitness for architectures even after those architectures are removed from the population and selects the architecture that has the best measure of fitness using the tracked measures of fitness.

In general, the above method of searching allows the population of candidate architectures to improve over time, resulting in an optimized neural network having better performance (e.g., better accuracy) when performing the particular machine learning task compared to existing neural network architecture search methods.

Further, using the described method, the system can automatically generate a resultant trained neural network that is able to achieve performance on a machine learning task competitive with or exceeding state-of-the-art hand-designed models while requiring little or no input from a neural network designer.

Figure 3:
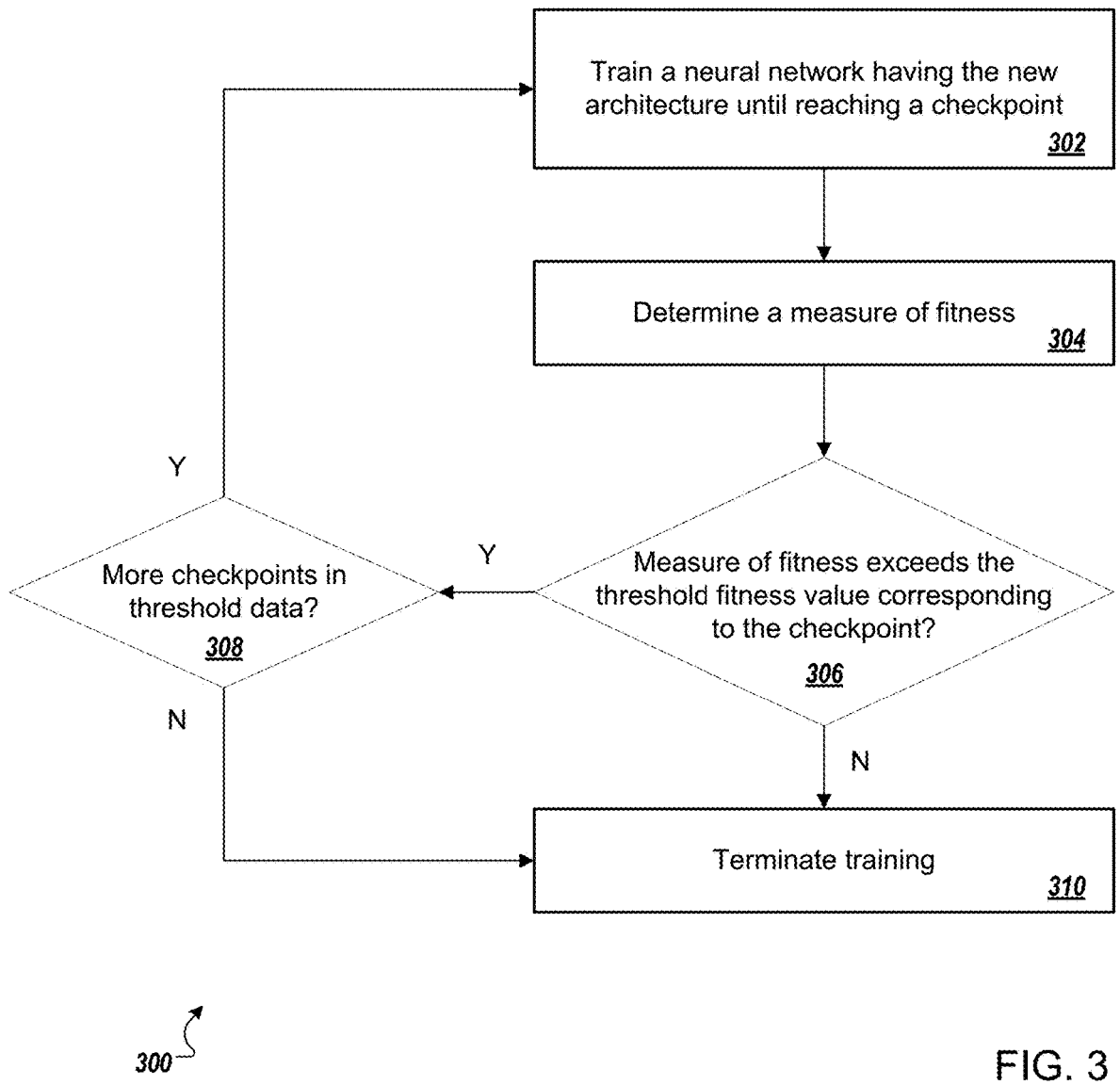
FIG. 3 is a flow diagram of an example process for determining when termination criteria are satisfied during training.

FIG. 3 is a flow diagram of an example process 300 for determining when termination criteria are satisfied during training. For convenience, the process 300 will be described as being performed by a system of one or more computers located in one or more locations. For example, a neural network architecture optimization system, e.g., the neural network architecture optimization system 100 of FIG. 1, appropriately programmed in accordance with this specification, can perform the process 300.

The system trains a neural network having the new candidate architecture until reaching a checkpoint in the threshold data (step 302). A checkpoint is one of a plurality of specific points during the training process of a neural network having the new candidate architecture. For example, a checkpoint can specify a specific number of training iterations and can be reached when the specific number of training iterations have been completed since a preceding checkpoint. As another example, a checkpoint can specify a specific quantity of elapsed time and can be reached when the specified quantity of time has elapsed since a preceding checkpoint.

Each checkpoint is associated with a corresponding threshold fitness value. In some implementations, the corresponding threshold fitness value specifies a least measure of fitness that the candidate architecture should have so that the system trains the neural network having the candidate architecture for more training iterations, i.e., until reaching a next checkpoint.

The system determines a measure of fitness of the candidate architecture at the checkpoint by evaluating the performance of the trained new neural network on a validation subset of the training data (step 304).

The system then determines whether the measure of fitness satisfies the threshold fitness value corresponding to the checkpoint (step 306).

If the system determines that the measure of fitness satisfies the threshold fitness value, the system proceeds to determining whether one or more additional checkpoints exist in the threshold data (step 308).

If the system determines that the measure of fitness satisfies the threshold fitness value, and in addition, one or more additional checkpoints exist in the threshold data, the system proceeds to training the neural network having the new candidate architecture until reaching a next checkpoint (step 302).

If no more additional checkpoints exist in the threshold data, the system trains the neural network for a predetermined number of iterations and then terminates the training (step 310).

If the system determines that the measure of fitness does not satisfy the threshold fitness value corresponding to the checkpoint, the system terminates the training of the neural network immediately at the checkpoint (step 310).

Figure 4:
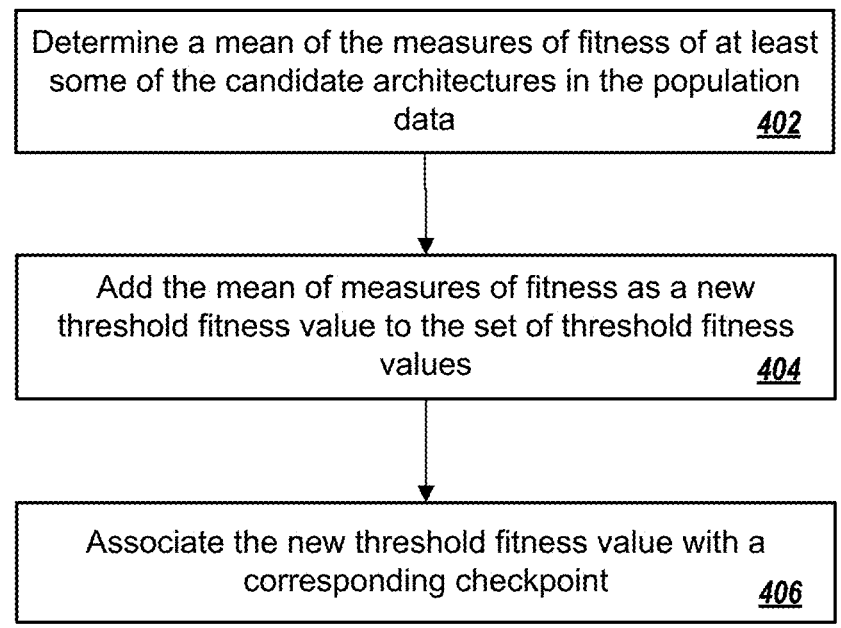
FIG. 4 is a flow diagram of an example process for adding new threshold fitness values to the threshold data as the search process progresses.

FIG. 4 is a flow diagram of an example process 400 for adding new threshold fitness values to the threshold data as the search process progresses. For convenience, the process 400 will be described as being performed by a system of one or more computers located in one or more locations. For example, a neural network architecture optimization system, e.g., the neural network architecture optimization system 100 of FIG. 1, appropriately programmed in accordance with this specification, can perform the process 400.

The system performs the process 400 periodically during the search process. In particular, the system can determine to add a new threshold fitness value when certain criteria are satisfied. The system can make this determination in any of a variety of ways.

For example, the system can determine whether a specified number (e.g., 10, 30, or 50) of new candidate architectures have been added to the population data since a preceding time that a threshold fitness value was added to the threshold data. As another example, the system can determine whether a specified period of time (e.g., 30 minutes, 60 minutes, or 120 minutes) has passed since a preceding time that a threshold fitness value was added to the threshold data.

If the system determines to add a new threshold fitness value, the system then determines a mean of the measures of fitness of at least some of the candidate architectures in the population data (step 402).

For example, the system can determine a mean of the measures of fitness of all candidate architectures in the population data.

As another example, the system can determine a mean of the measures of fitness of the candidate architectures in the population data that have received the most training iterations, i.e., candidate architectures having measures of fitness that constantly satisfy every one of the set of threshold fitness values and thus have passed all existing checkpoints in the threshold data.

In particular, determining a mean represents calculating an arithmetic mean, i.e., the sum of a collection of measures of fitness of candidate architectures divided by the number of candidate architectures in the collection.

The system adds the mean of measures of fitness as a new threshold fitness value to the set of threshold fitness values (404). In some implementations, depending on the choice of metric used to determine the measure of fitness, the system optionally maintains the set of threshold fitness values either in an ascending or a descending order. That is, if a higher measure of fitness represents satisfying performance, the new threshold fitness value is higher than the last existing threshold fitness value in the threshold data. Alternatively, if a lower measure of fitness represents satisfying performance, the new threshold fitness value is lower than the last existing threshold fitness value in the threshold data.

The system also associates the new threshold fitness value with a corresponding checkpoint (step 406). In implementations where a checkpoint specifies a specific number of training iterations, for example, the corresponding new checkpoint can be reached when an additional specific number of training iterations have been completed since the last existing checkpoint in the threshold data.

As described above, these techniques can be used to determine an optimized neural network architecture for any of a variety machine learning tasks.

As a particular example, these techniques can be used to determine an optimized architecture for an attention-based neural network that performs sequential processing machine learning tasks (e.g., machine translation tasks). The attention-based neural network includes an encoder neural network that receives an input sequence and generates an encoded representation of the input sequence and a decoder neural network that generates an output for the sequential task from the encoded representation. By applying the described techniques, the system can determine respective architectures for both the encoder neural network and the decoder neural network that result in high performance on the sequential processing task. An example of a neural network model having the optimized architecture will be described in more detail below with reference to FIG. 5.

In particular, during the search process, each of the candidate architectures in the population includes a stack of cells, i.e., encoder cells or decoder cells. Generally, a cell is configured to receive a cell input and to generate a cell output for the cell input.

A cell in turn includes a stack of operation blocks, for example, three, five, or ten operation blocks. Each operation block in the cell receives one or more input hidden states, and performs separate transformations to the input hidden states to produce respective output hidden states. In some implementations, an operation block applies a first transformation to a first input hidden state, applies a second transformation to a second hidden state, and applies a combination to the outputs of the first and second operations to generate a combined output hidden state.

Specifically, a transformation can be a composite of any one or more of the following functions—input selection, layer normalization, standard convolution, depth-wise separable convolution, lightweight convolution, multi-head attention, gated linear unit, attend to encoder, identity, dead branch, relative output dimension, swish activation, ReLU activation, and leakly ReLU activation. A combination can be any one of the following functions—addition, concatenation, and multiplication.

In addition, when determining the optimized architecture, the system generates new candidate architectures by applying mutations to a selected architecture, i.e., replacement of an existing component in the architecture with a new component, or addition of a new component into the architecture. Therefore, by doing so, the system is able to search for candidate architectures with different numbers of cells, different numbers of operation blocks, different transformation functions, and different combination functions.

Figure 5:
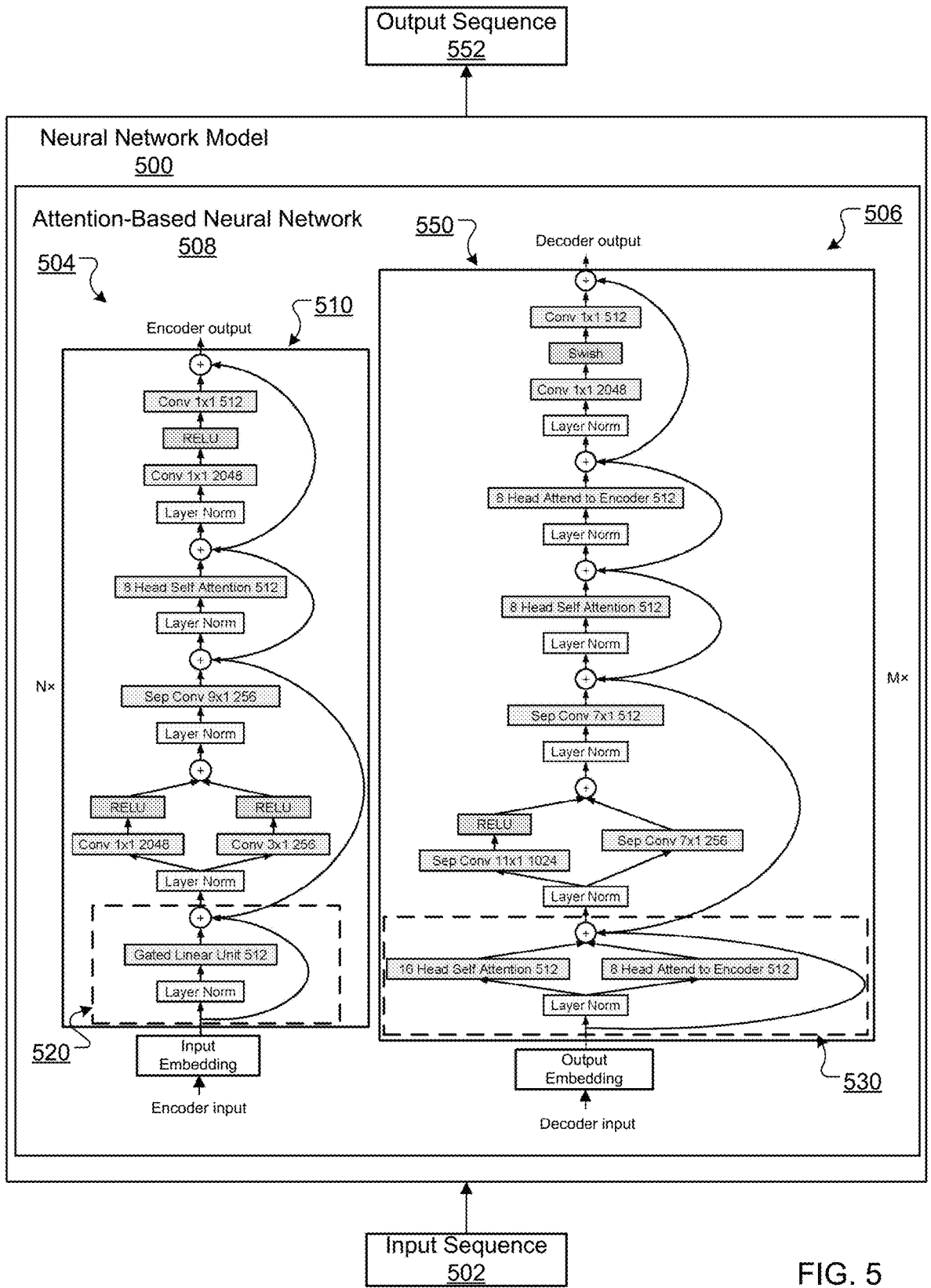
FIG. 5 illustrates an example neural network model having the optimized architecture.

FIG. 5 illustrates an example neural network model 500 having the optimized architecture.

The neural network model 500 receives an input sequence 502 and processes the input sequence 502 to transduce the input sequence 502 into an output sequence 552.

The input sequence 502 has a respective network input at each of multiple input positions in an input order and the output sequence 552 has a respective network output at each of multiple output positions in an output order. That is, the input sequence 502 has multiple inputs arranged according to an input order and the output sequence 552 has multiple outputs arranged according to an output order. For example, if the sequential processing machine learning task is a machine translation task, then each input sequence 502 represents a source sentence with multiple words and punctuations arranged in a corresponding source order, and each output sequence 552 represents a target sentence with multiple words and punctuations arranged in a corresponding target order.

The neural network model 500 includes an attention-based neural network 508, which in turn includes an encoder neural network 504 and a decoder neural network 506 that are both attention-based. In brief, the attention mechanism relates different position of a single input sequence in order to compute a representation of the sequence. The use of attention mechanisms allows the network to effectively learn dependencies between distant positions during training, improving the performance of the network on sequential processing machine learning tasks. Attention mechanisms are described in more detail in A. Vaswani, N. Shazeer, N. Parmar, J. Uszkoreit, L. Jones, A. N. Gomez, L. Kaiser, I.

Polosukhin, "Attention Is All You Need," In NIPS 2017, available at https://arxiv.org/pdf/1706.03762.pdf.

Specifically, the encoder neural network 504 is configured to receive the input sequence 502 and generate an encoder output, which includes a respective encoded representation of each of the network inputs in the input sequence. In some cases, an encoded representation is a vector or other ordered collection of numeric values.

The decoder neural network 506 is then configured to use the encoded representations of the network inputs to generate the output sequence 552.

The encoder neural network 504 includes an embedding layer and a stack of one or more encoder cells 510. In particular, as shown in FIG. 5, the encoder neural network 504 includes N encoder cells 510.

The embedding layer is configured to, for each network input in the input sequence, map the network input to a numeric representation of the network input in an embedding space, e.g., into a vector in the embedding space. The embedding layer then provides the numeric representations of the network inputs to the first encoder cell in the stack of encoder cells 510, i.e., to the first encoder cell 510 of the N encoder cells 510.

Each of the encoder cells 510 is configured to receive a respective encoder cell input for each of the plurality of input positions and to generate a respective encoder cell output for each of the plurality of input positions.

The encoder cell output generated by the last encoder cell in the stack are then used as the encoded representations of the network inputs.

For the first encoder cell in the stack, the encoder cell input is the numeric representations generated by the embedding layer, and, for each encoder cell other than the first encoder cell in the stack, the encoder cell input is the encoder cell output of a preceding encoder cell in the stack.

Each of the encoder cells 510 processes the input using a stack of operation blocks. For the first operation block in the stack, the hidden state input is the encoder cell input, and, for each operation block other than the first operation block in the stack, the hidden state input is the hidden state output of a preceding operation block in the stack.

The operation block 520 is one example of the stack of operation blocks included in the encoder cell 510. The operation block 520, for example, applies a transformation consisting of "Layer Norm" and "Gated Linear Unit 512" to the received hidden state input. The transformation output, combined with the hidden state input via addition, is used as the hidden state output for the operation block 520.

Detailed explanations for all transformation functions used in the attention-based neural network 508, including the transformation functions used in operation block 520, can be found below in Table 1.

The hidden state output generated by the last operation block in the stack, combined with the hidden state output of a preceding operation block, is then used as the output of encoder cell 510, and is further used as the input of any subsequent encoder cells to generate the encoder output.

Decoder neural network 506 includes an embedding layer and a stack of one or more decoder cells 550. In particular, as shown in FIG. 5, the decoder neural network 506 includes M decoder cells 550. Each decoder cell 550 processes an input using a stack of operation blocks.

The operation block 530 is one example of the stack of operation blocks included in the decoder cell 550. The operation block 530, for example, applies a transformation of "Layer Norm" and two separate transformations of "16 Head Self Attention 512" and "8 Head Attend to Encoder 512" to the received hidden state input. The transformation outputs, along with the hidden state input, are then combined via addition to generate the hidden state output for the operation block 530.

Similar to the encoder neural network as described above, in the decoder neural network 506, for the first decoder cell in the stack, the decoder cell input includes encoder output and numeric representations of input sequence 502, and, for each decoder cell other than the first decoder cell in the stack, the decoder cell input is the decoder cell output of a preceding decoder cell in the stack. For the first operation block in the stack, the hidden state input is the decoder cell input, and, for each operation block other than the first operation block in the stack, the hidden state input is the hidden state output of a preceding operation block in the stack.

The decoder cell output generated by the last decoder cell in the stack is then used as the decoder output, which is further used as output sequence 552.

TABLE 1

Detailed description of transformation functions.

| | |
|---|---|
| Layer Norm | Layer normalization layer |
| Conv | Standard convolutional layer with customizable kernel size and output dimension |
| Sep Conv | Depth-wise separable convolutional layer with customizable kernel size and output dimension |
| Self Attention | Attention layer with customizable number of attention heads |
| Gated Linear Unit | Gated linear unit layer with customizable output dimension |
| Attend to Encoder | Attend to encoder layer with customizable number of attention heads |
| RELU | Rectified linear unit activation layer |
| Swish | Swish activation layer |
| Identity | Layer with no transformation applied to input |

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving training data for training a neural network to perform a machine learning task, the training data comprising a plurality of training examples and a respective target output for each of the training examples; and
   searching for an optimized neural network architecture for performing the machine learning task, comprising:
      maintaining population data comprising, for each candidate architecture in a population of candidate architectures, (i) data defining the candidate architecture, and (ii) a measure of fitness representing the performance of the candidate architecture;
      maintaining threshold data comprising a set of threshold fitness values, wherein each threshold fitness value is associated with a corresponding checkpoint of a sequence of checkpoints during the training of the neural network, each checkpoint being a different specific point over a course of the training of the neural network; and
      repeatedly performing the following operations:
         selecting one or more candidate architectures from the population data;
         generating a new architecture from the one or more selected candidate architectures;
         performing one or more iterations of the following training steps to train a neural network having the new architecture until termination criteria for the training are satisfied:
            training the neural network having the new architecture until reaching a next checkpoint in the sequence of checkpoints;
            determining a measure of fitness of the neural network having the new architecture as of the next checkpoint; and
            determining, based on whether the measure of fitness satisfies the corresponding threshold fitness value associated with the next checkpoint, whether the termination criteria for the training are satisfied; and
         determining a final measure of fitness of the neural network having the new architecture after the training; and
         adding data defining the new architecture and the final measure of fitness for the neural network having the new architecture to the population data.

2. The method of claim 1, wherein the operations further comprise:
   determining whether to add a new threshold fitness value to the set of threshold fitness values; and
   in response to determining to add a new threshold fitness value:
      determining a mean of the measures of fitness of at least some of the candidate architectures in the population data;
      adding the mean of the measures of fitness as a new threshold fitness value to the set of threshold fitness values; and
      associating the new threshold fitness value with a corresponding checkpoint.

3. The method of claim 1, wherein the operations further comprise:
   removing one or more candidate architectures from the population data based on their respective measures of fitness.

4. The method of claim 1, wherein the operations further comprise:
   initializing the population with a plurality of default candidate architectures.

5. The method of claim 1, wherein the data defining the candidate architecture comprises:
   data specifying an architecture for one or more components that are each repeated multiple times to generate the candidate architecture.

6. The method of claim 5, wherein generating a new architecture from the one or more selected candidate architectures comprises:

modifying the architecture for at least one of the components in one of the selected candidate architectures.

7. The method of claim 6, wherein modifying the architecture for at least one of the components in one of the selected candidate architectures comprises:
   randomly selecting a mutation from a set of mutations; and
   applying the randomly selected mutation to the architecture for the component.

8. The method of claim 6, wherein modifying the architecture for at least one of the components in one of the selected candidate architectures further comprises:
   selecting a component in a first one of the selected candidate architectures; and
   modifying a corresponding component in a second one of the selected candidate architectures to have the same architecture as the selected component in the first one of the selected candidate architectures.

9. The method of claim 1, wherein selecting one or more candidate architectures from the population data comprises:
   randomly selecting a plurality of candidate architectures from the population data; and
   selecting, from the plurality of randomly selected candidate architectures, one or more candidate architectures based on their respective measures of fitness.

10. The method of claim 1, wherein searching for an optimized neural network architecture for performing the machine learning task further comprises:
    after repeatedly performing the following operations, selecting the candidate architecture in the population having the best measure of fitness as the optimized architecture.

11. The method of claim 1, wherein the machine learning task is one or more of the following: image classification, object detection, machine translation or speech recognition.

12. The method of claim 1, wherein:
    each checkpoint specifies a specific number of training iterations and is reached when the specific number of training iterations have been completed since a preceding checkpoint or since a beginning of the training of the neural network having the new architecture.

13. The method of claim 1, wherein:
    each checkpoint specifies a specific quantity of elapsed time and is reached when the specified quantity of time has elapsed since a preceding checkpoint or since the beginning of the training of the neural network having the new architecture.

14. The method of claim 1, wherein determining whether the termination criteria for the training are satisfied further comprises:
    determining that the measure of fitness does not satisfy the corresponding threshold fitness value associated with the next checkpoint; and
    in response, determining that the termination criteria for the training are satisfied.

15. The method of claim 1, wherein determining whether the termination criteria for the training are satisfied further comprises:
    determining whether the next checkpoint is a last checkpoint in the sequence of checkpoints.

16. The method of claim 1, wherein determining whether the termination criteria for the training are satisfied further comprises:
    determining that the measure of fitness satisfies the corresponding threshold fitness value associated with the next checkpoint; and
    in response, continuing to train the neural network having the new architecture by performing an additional iteration of the training steps.

17. A system comprising one or more computers and one or more storage devices storing instructions that are operable, when executed by the one or more computers, to cause the one or more computers to perform operations comprising:
    receiving training data for training a neural network to perform a machine learning task, the training data comprising a plurality of training examples and a respective target output for each of the training examples; and
    searching for an optimized neural network architecture for performing the machine learning task, comprising:
    maintaining population data comprising, for each candidate architecture in a population of candidate architectures, (i) data defining the candidate architecture, and (ii) a measure of fitness representing the performance of the candidate architecture;
    maintaining threshold data comprising a set of threshold fitness values, wherein each threshold fitness value is associated with a corresponding checkpoint of a sequence of checkpoints during the training of the neural network, each checkpoint being a different specific point over a course of the training of the neural network; and
    repeatedly performing the following operations:
       selecting one or more candidate architectures from the population data;
       generating a new architecture from the one or more selected candidate architectures;
       performing one or more iterations of the following training steps to train a neural network having the new architecture until termination criteria for the training are satisfied:
          training the neural network having the new architecture until reaching a next checkpoint in the sequence of checkpoints;
          determining a measure of fitness of the neural network having the new architecture as of the next checkpoint; and
          determining, based on whether the measure of fitness satisfies the corresponding threshold fitness value associated with the next checkpoint, whether the termination criteria for the training are satisfied; and
       determining a final measure of fitness of the neural network having the new architecture after the training; and
       adding data defining the new architecture and the final measure of fitness for the neural network having the new architecture to the population data.

18. The system of claim 17, wherein the search operations further comprise:
    determining whether to add a new threshold fitness value to the set of threshold fitness values; and
    in response to determining to add a new threshold fitness value:
       determining a mean of the measures of fitness of at least some of the candidate architectures in the population data;
       adding the mean of the measures of fitness as a new threshold fitness value to the set of threshold fitness values; and
       associating the new threshold fitness value with a corresponding checkpoint.

19. The system of claim 17, wherein the search operations further comprise:
   removing one or more candidate architectures from the population data based on their respective measures of fitness.

20. The system of claim 17, wherein the search operations further comprise:
   initializing the population with a plurality of default candidate architectures.

21. The system of claim 17, wherein the data defining the candidate architecture comprises:
   data specifying an architecture for one or more components that are each repeated multiple times to generate the candidate architecture.

22. The system of claim 21, wherein generating a new architecture from the one or more selected candidate architectures comprises:
   modifying the architecture for at least one of the components in one of the selected candidate architectures.

23. The system of claim 22, wherein modifying the architecture for at least one of the components in one of the selected candidate architectures comprises:
   randomly selecting a mutation from a set of mutations; and
   applying the randomly selected mutation to the architecture for the component.

24. The system of claim 22, wherein modifying the architecture for at least one of the components in one of the selected candidate architectures further comprises:
   selecting a component in a first one of the selected candidate architectures; and
   modifying a corresponding component in a second one of the selected candidate architectures to have the same architecture as the selected component in the first one of the selected candidate architectures.

25. The system of claim 17, wherein selecting one or more candidate architectures from the population data comprises:
   randomly selecting a plurality of candidate architectures from the population data; and
   selecting, from the plurality of randomly selected candidate architectures, one or more candidate architectures based on their respective measures of fitness.

26. One or more non-transitory computer-readable storage media storing instructions that when executed by one or more computers cause the one or more computers to perform operations comprising:
   receiving training data for training a neural network to perform a machine learning task, the training data comprising a plurality of training examples and a respective target output for each of the training examples; and
   searching for an optimized neural network architecture for performing the machine learning task, comprising:
   maintaining population data comprising, for each candidate architecture in a population of candidate architectures, (i) data defining the candidate architecture, and (ii) a measure of fitness representing the performance of the candidate architecture;
   maintaining threshold data comprising a set of threshold fitness values, wherein each threshold fitness value is associated with a corresponding checkpoint of a sequence of checkpoints during the training of the neural network, each checkpoint being a different specific point over a course of the training of the neural network; and
   repeatedly performing the following operations:
      selecting one or more candidate architectures from the population data;
      generating a new architecture from the one or more selected candidate architectures;
      performing one or more iterations of the following training steps to train a neural network having the new architecture until termination criteria for the training are satisfied:
         training the neural network having the new architecture until reaching a next checkpoint in the sequence of checkpoints;
         determining a measure of fitness of the neural network having the new architecture as of the next checkpoint; and
         determining, based on whether the measure of fitness satisfies the corresponding threshold fitness value associated with the next checkpoint, whether the termination criteria for the training are satisfied; and
      determining a final measure of fitness of the neural network having the new architecture after the training; and
      adding data defining the new architecture and the final measure of fitness for the neural network having the new architecture to the population data.

* * * * *